(12) United States Patent
Fang et al.

(10) Patent No.: US 11,029,776 B2
(45) Date of Patent: Jun. 8, 2021

(54) TOUCH PANEL AND MANUFACTURING METHOD THEREFOR, AND ROLL SHEET OF TOUCH SENSOR

(71) Applicants: TPK Touch Solutions Inc., Taipei (TW); TPK Glass Solutions (Xiamen) Inc., Xiamen (CN)

(72) Inventors: Wei-Chia Fang, Hsinchu (TW); Ho-Chien Wu, New Taipei (TW); Chun-Hung Chu, Hsinchu (TW); Chung-Chin Hsiao, Hsinchu (TW)

(73) Assignees: TPK Touch Solutions Inc., Taipei (TW); TPK Glass Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 16/579,808

(22) Filed: Sep. 23, 2019

(65) Prior Publication Data

US 2020/0097113 A1 Mar. 26, 2020

(30) Foreign Application Priority Data

Sep. 21, 2018 (CN) .......................... 201811108349.1

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05)

(58) Field of Classification Search
CPC combination set(s) only.
See application file for complete search history.

(56) References Cited

U.S. PATENT DOCUMENTS

| | | | | |
|---|---|---|---|---|
| 2012/0319980 | A1* | 12/2012 | Nagaoka | H05K 1/0269 345/173 |
| 2015/0130746 | A1* | 5/2015 | Jung | G06F 3/0412 345/174 |
| 2015/0331533 | A1* | 11/2015 | McMillen | A61B 5/6843 345/174 |
| 2016/0320876 | A1* | 11/2016 | Son | G06F 3/0446 |
| 2018/0158894 | A1* | 6/2018 | Park | H01L 51/5253 |
| 2018/0348577 | A1* | 12/2018 | Pousthomis | G03B 21/204 |
| 2019/0002719 | A1* | 1/2019 | Pousthomis | B01J 13/14 |
| 2020/0081563 | A1* | 3/2020 | Wang | G06F 3/041 |

\* cited by examiner

*Primary Examiner* — Van N Chow
(74) *Attorney, Agent, or Firm* — Idea Intellectual Limited; Margaret A. Burke; Sam T. Yip

(57) ABSTRACT

A touch panel includes a substrate, a catalytic layer, peripheral traces, marks, first cover layers and second cover layers. The catalytic layer is formed on the peripheral area of the substrate, and the peripheral traces are formed on the catalytic layer. Each peripheral trace has a side wall and a top surface. The marks are formed on the catalytic layer, and each mark has a side wall and a top surface. The first cover layers cover the top surfaces of the peripheral traces, and the second cover layers cover the top surfaces of the marks. Each of the first cover layers and the second cover layers includes metal nanowires. The manufacturing method of the touch panel and a roll sheet of touch sensors are also disclosed.

36 Claims, 14 Drawing Sheets

TOUCH PANEL AND MANUFACTURING METHOD THEREFOR, AND ROLL SHEET OF TOUCH SENSOR

CROSS REFERENCE TO RELATED APPLICATIONS

This Non-provisional application claims priority under 35 U.S.C. § 119(a) on Patent Application No(s). 201811108349.1 filed in People's Republic of China on Sep. 21, 2018, the entire contents of which are hereby incorporated by reference.

BACKGROUND

Technology Field

The present disclosure relates to a touch panel, a manufacturing method of a touch panel, and a roll sheet of touch sensors.

Description of Related Art

Transparent conductors are light permeable and electrically conductive, making them suitable for use in many display or touch devices. Traditional transparent conductors have been made of any of a variety of metal oxides, such as ITO (indium tin oxide), IZO (indium zinc oxide), CTO (cadmium tin oxide), or AZO (aluminum-doped zinc oxide). However, any flexible film layer made of any of these metal oxides cannot satisfy the flexibility requirements of display devices due to cracking of the oxides under bending stress. Therefore, various flexible transparent conductors, such as transparent conductors made of conductive nanowires, have been developed.

In a typical nanowire-based flexible touch panel, a metal layer is configured in the touch panel to form traces in a peripheral area which surrounds a viewable area. Metal material is sputtered on the entire surface of the touch panel substrate, and then unnecessary parts of the metal layer are removed according to designed patterns. Most of the touch panel is occupied by the viewable area, so that almost all of the metal layer is removed in the metal removing process and only a small part of the metal layer is left in the peripheral area to form the traces.

Alignment tolerance/deviation area is typically reserved to ensure proper alignment of the nanowires and the traces in the peripheral area. The alignment tolerance area acts as a constraint on the lower limit of trace dimensions in the peripheral area. In a roll-to-roll process, deformation of the substrate exacerbates the alignment tolerance/deviation area. The alignment tolerance/deviation area trades off against border dimension, which is trending to zero in state-of-the-art consumer devices.

SUMMARY

In some embodiments of this disclosure, the metal material is selectively disposed on the specific locations on the substrate for controlling the applied amount of the metal material, thereby controlling the manufacturing cost or material cost.

In some embodiments of this disclosure, the peripheral traces are at least covered by the first cover layers formed by the metal nanowires, and the marks are at least covered by the second cover layers formed by the metal nanowires. Accordingly, the conventional alignment tolerance/deviation area reserved for the alignment process is not needed, so that the width of peripheral traces can be reduced so as to satisfy the requirement of the narrow border display. In addition, in some embodiments of this disclosure, a roll sheet of touch sensors and a manufacturing method of the touch panel are also disclosed.

According to some embodiments of this disclosure, a touch panel comprises: a substrate comprising a display area and a peripheral area; a catalytic layer formed on the peripheral area; a peripheral trace formed on the catalytic layer, wherein the peripheral trace has a side wall and a top surface; a mark formed on the catalytic layer, wherein the mark has a side wall and a top surface; a first cover layer and a second cover layer, wherein the first cover layer covers the top surface of the peripheral trace, the second cover layer covers the top surface of the mark, the first cover layer and the second cover layer at least comprise metal nanowires, and the peripheral trace, the mark, the first cover layer and the second cover layer are located within the peripheral area of the substrate; and a touch sensing electrode formed on the display area of the substrate, wherein the touch sensing electrode is electrically connected with the peripheral traces.

In some embodiments of this disclosure, the catalytic layer is an insulation layer containing catalytic particles.

In some embodiments of this disclosure, the catalytic particles are nanoparticles.

In some embodiments of this disclosure, the touch panel further comprises: a film layer covering the touch sensing electrode, the first cover layer, the second cover layer, and an exposing parts of the catalytic layer on the non-conductive area of the peripheral area.

In some embodiments of this disclosure, the touch panel further comprises a non-conductive area located on the display area and the peripheral area.

In some embodiments of this disclosure, the non-conductive area further comprises a filling layer made of the same material as the film layer. The filling layer made of the same material as the film layer is filled in the gap between the adjacent peripheral traces, or in the gap between the adjacent touch sensing electrodes.

In some embodiments of this disclosure, the first cover layer has a side surface, and the side surface and the side wall of the peripheral trace are a co-etched surface.

In some embodiments of this disclosure, the second cover layer has a side surface, and the side surface and the side wall of the mark are a co-etched surface.

In some embodiments of this disclosure, the side walls of the peripheral trace and the side walls of the mark do not contain any of the metal nanowires. The metal nanowires do not protrude from the side surfaces of the first or second cover layers.

In some embodiments of this disclosure, the mark comprises a bonding alignment mark.

In some embodiments of this disclosure, a width of the peripheral trace ranges from about 5 μm to 20 μm, and a distance between adjacent peripheral traces ranges from about 5 μm to 20 μm.

In some embodiments of this disclosure, the peripheral trace and the mark are made of metal material, and the touch sensing electrode at least comprises the metal nanowires.

In some embodiments of this disclosure, a resistance value between adjacent peripheral traces is greater than about $1 \times 10^3$ ohm, and a leakage current between adjacent peripheral traces is less than about $1 \times 10^{-6}$ A.

According to some embodiments of this disclosure, a roll sheet of touch sensors comprises: a substrate, wherein the substrate is configured with a plurality of touch panels and a removing area other than the touch panels, each of the touch panels comprises a display area, a peripheral area, a peripheral trace, a first cover layer and a touch sensing electrode, wherein a catalytic layer is formed on the peripheral area and the removing area, the peripheral trace is formed on the catalytic layer, the peripheral trace has a side wall and a top surface, the first cover layer covers the top surfaces of the peripheral traces, the peripheral trace and the first cover layer are formed on the peripheral area of each of the touch panels, the touch sensing electrode is formed on the display area of each of the touch panels, and the touch sensing electrode is electrically connected with the peripheral traces; a mark formed on the catalytic layer, wherein the mark has a side wall and a top surface; and a second cover layer covering the top surface of the mark, wherein the first cover layer and the second cover layer at least comprise metal nanowires.

In some embodiments of this disclosure, the catalytic layer is an insulation layer containing catalytic particles.

In some embodiments of this disclosure, the catalytic particles are nanoparticles.

In some embodiments of this disclosure, each of the touch panels further comprises a film layer covering the touch sensing electrode, the catalytic layer, the first cover layers and the second cover layers.

In some embodiments of this disclosure, each of the touch panels further comprises a non-conductive area located on the display area and the peripheral area.

In some embodiments of this disclosure, the non-conductive area comprises a filling layer made of the same material as the film layer. The non-conductive area comprises a gap.

In some embodiments of this disclosure, the first cover layer has a side surface, and the side surface and the side wall of the peripheral trace are a co-etched surface.

In some embodiments of this disclosure, the second cover layer has a side surface, and the side surface and the side wall of the mark are a co-etched surface.

In some embodiments of this disclosure, the side walls of the peripheral traces and the side walls of the marks do not contain any of the metal nanowires.

In some embodiments of this disclosure, the mark comprises a bonding alignment mark disposed in the peripheral area of each of the touch panels, or cutting alignment marks disposed between the adjacent touch panels, or alignment marks, direction marks, scale marks or digital/letter marks disposed on the substrate.

In some embodiments of this disclosure, a width of the peripheral traces ranges from about 5 μm to 20 μm, and a distance between adjacent peripheral traces ranges from about 5 μm to 20 μm.

In some embodiments of this disclosure, the peripheral traces and the marks are made of metal material, and the touch sensing electrode at least comprises the metal nanowires.

According to some embodiments of this disclosure, a manufacturing method of a touch panel comprises: providing a substrate, wherein the substrate comprises a display area and a peripheral area; forming a catalytic layer on the peripheral area; forming a metal layer on the catalytic layer; forming a metal nanowire layer on the display area and the peripheral area; and performing a patterning step for patterning the metal layer to form a plurality of peripheral traces and a plurality of marks. The peripheral traces and the marks are formed on the catalytic layer. The peripheral trace has a side wall and a top surface, and mark has a side wall and a top surface. The patterning step also patterns the metal nanowire layer to form a plurality of first cover layers and a plurality of second cover layers. The first cover layer covers the top surface of the peripheral trace, and the second cover layer covers the top surface of the mark.

In some embodiments of this disclosure, the patterning step also patterns the metal nanowire layer to form a touch sensing electrode. The touch sensing electrode is located on the display area of the substrate, and the touch sensing electrode is electrically connected with the peripheral traces.

In some embodiments of this disclosure, the catalytic layer is printed on the peripheral area.

In some embodiments of this disclosure, the catalytic layer is formed by printing an insulation material containing catalytic particles on the peripheral area.

In some embodiments of this disclosure, the catalytic particles are nanoparticles.

In some embodiments of this disclosure, the metal layer is formed on the catalytic layer by chemical plating.

In some embodiments of this disclosure, the patterning step is to simultaneously etch the metal nanowire layer and the metal layer by an etching agent.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Figure 1A:
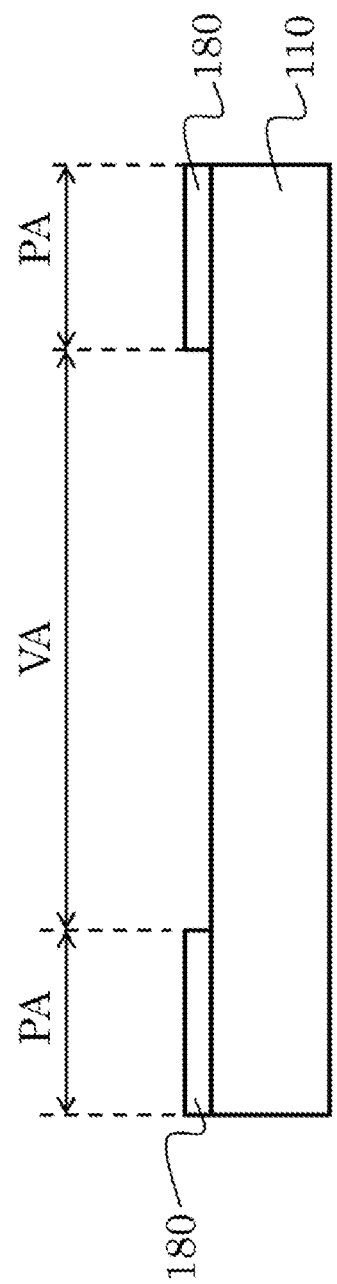
FIGS. 1A to 1C are schematic diagrams showing the steps of manufacturing the touch panel according to some embodiments of this disclosure.

The various embodiments of the present disclosure are illustrated in the drawings, and the practical details will be described in the following embodiments. However, it should be understood that these practical details are not intended to limit the disclosure. That is, in some embodiments of the disclosure, these practical details are not necessary. In addition, some of the conventional structures and elements are shown in the drawings in a simplified manner.

As used herein, "about" or "roughly" is generally an error or a range within 20% of a value, preferably a range within 10%, and more preferably a range within 5%. Unless otherwise stated, the numerical values mentioned in this disclosure are considered as approximations; that is, they have an error or a range as indicated by "about" or "roughly."

Figure 2:
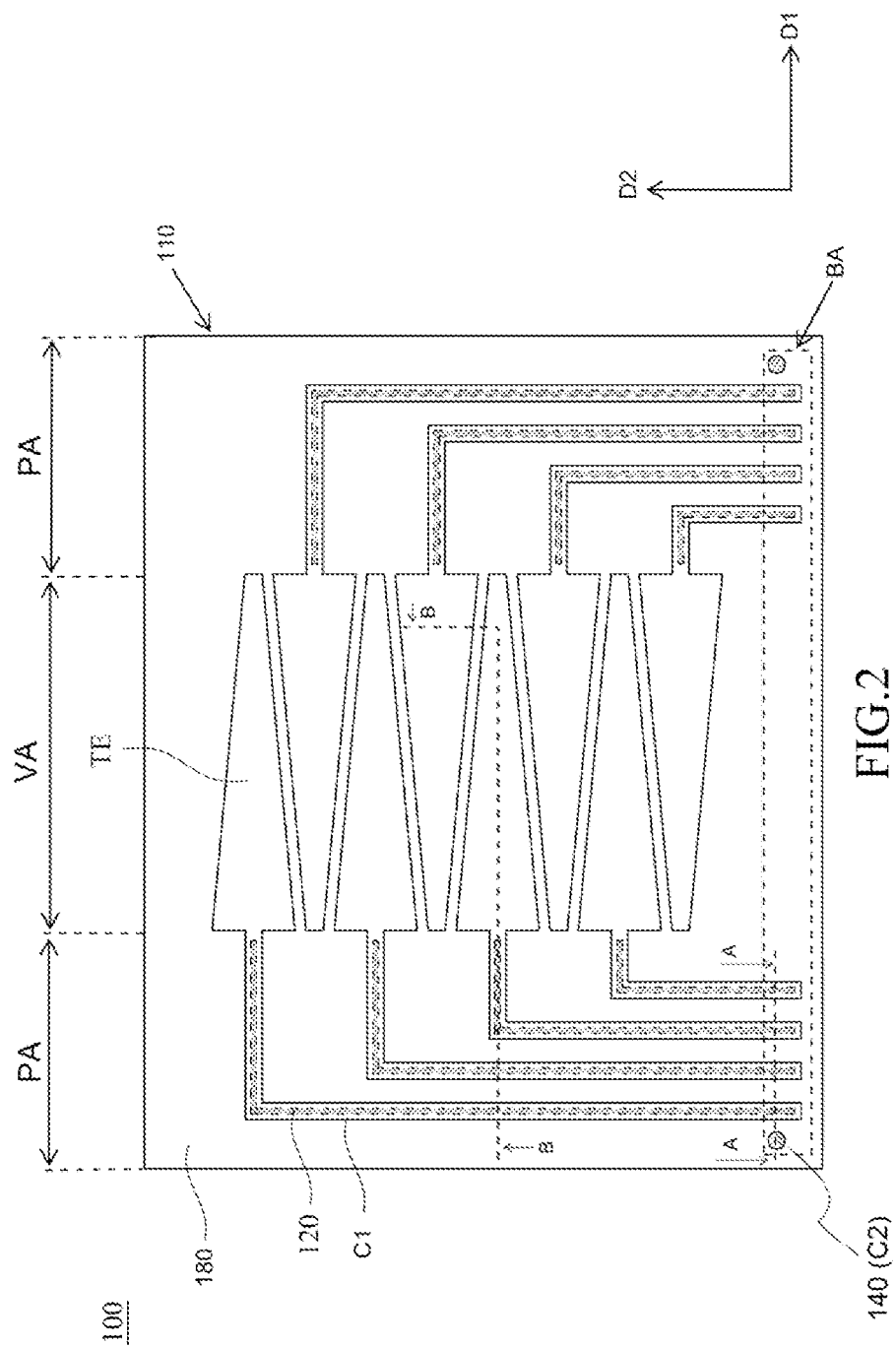
FIG. 2 is a top view of the touch panel according to some embodiments of this disclosure.

FIG. 2 is a top view of a touch panel 100 according to some embodiments of this disclosure. Referring to FIG. 2, the touch panel 100 comprises a substrate 110, peripheral traces 120, marks 140, first cover layers C1, second cover layers C2, catalytic layers 180 and touch sensing electrodes TE. Each of the trace 120, the mark 140, the first cover layer C1, the second cover layer C2, the catalytic layer 180 and the touch sensing electrode TE can be singular or plural. To be noted, the amounts of the components shown in the following embodiments and drawings are for illustration only and are not intended as limiting on this disclosure. As shown in FIG. 2, the substrate 110 comprises a display area VA and a peripheral area PA. The peripheral area PA is disposed at one side of the display area VA. For example, the peripheral area PA can be disposed at four sides of the display area VA (including the top side, the bottom side, the left side and the right side). In other embodiments, the peripheral area PA can be disposed at the left side and the bottom side of the display area VA (an L-shape region). Referring to FIG. 2 again, the catalytic layer 180 is formed on the peripheral area PA, and eight peripheral traces 120 as well as eight first cover layers C1 corresponding to the peripheral traces 120 are formed on the peripheral area PA of the substrate 110. The touch sensing electrodes TE are formed on the display area VA of the substrate 110. In this embodiment, the configuration of the catalytic layer 180 allows to form the metal material, which is used to form the peripheral traces 120 and the marks 140, only on the peripheral area PA without forming the metal material on the display area VA, thereby sufficiently decreasing the cost for the metal material in the conventional manufacturing process.

In this embodiment, two marks 140 as well as two second cover layers C2 corresponding to the marks 140 are formed on the peripheral area PA of the substrate 110. The first cover layers C1 and the second cover layers C2 are disposed on the top surfaces 124 of the peripheral traces 120 and the top surfaces 144 of the marks 140, respectively, so that the material layers can be formed at the predetermined positions without the additional alignment step. Accordingly, the requirement for the alignment tolerance/deviation area in the manufacturing process can be reduced or be omitted, thereby decreasing the width of the peripheral area PA so as to achieve the requirement of narrow/slim/ultra-slim border display products.

Figure 1B:
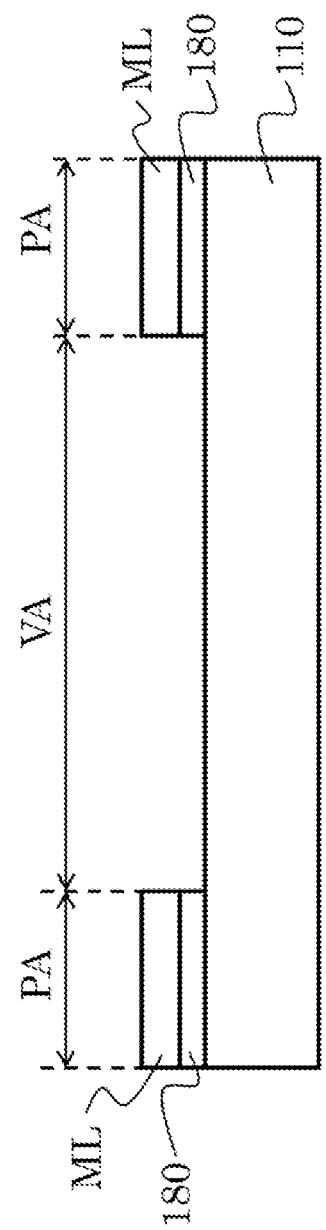
Figure 1C:
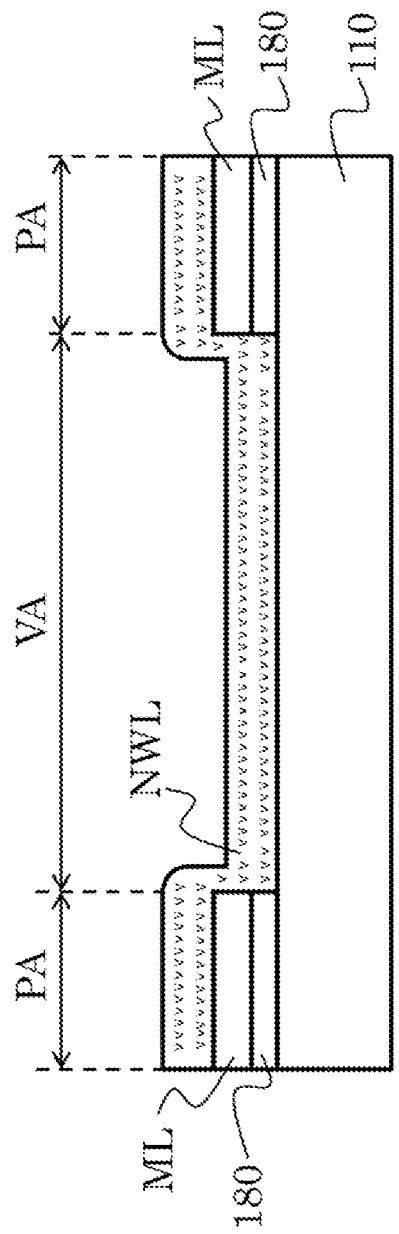

Specifically, as shown in FIGS. 1A to 1C, the touch panel of this disclosure can be manufactured by the following steps. First, the substrate 110 is provided, and the substrate 110 is defined with a peripheral area PA and a display area VA in advance. Next, the catalytic layer 180 is formed on the peripheral area PA, as shown in FIG. 1A. Then, the metal layer ML is formed on the catalytic layer 180, as shown in FIG. 1B. As shown in FIG. 1C, the next step is that the metal nanowire layer NWL is formed on the peripheral area PA and the display area VA. Then, a patterning step is performed to form the first cover layers C1, the second cover layers C2, the peripheral traces 120 and the marks 140. The detailed description of these steps will be illustrated hereinafter.

As shown in FIG. 1A, the catalytic layer 180 is formed on the substrate 110, which is used to help or catalyze the deposition of the metal layer ML, so it can be referred to an activation layer. In one embodiment, the catalytic layer 180 can be formed by printing (e.g. a letterpress printing or an intaglio printing) only on the peripheral area PA of the substrate 110, but this disclosure is not limited thereto. In some embodiments, the catalytic layer 180 can be an insulation layer, or an insulation layer comprising catalytic particles. For example, the catalytic layer 180 can be made of acrylic resin or epoxy resin comprising conductive nanoparticles or catalytic nanoparticles. In other words, the particles are distributed in the resin layer, and the catalytic layer 180 is substantially insulated. In one embodiment, the nanoparticles can be Pa nanoparticles, Cu/Protactinium (Pa) nanoparticles, or the likes, and the thickness of the catalytic layer 180 is less than about 1 μm (e.g., about 1 μm to 10 nm).

As shown in FIG. 1B, the metal layer ML is formed on the catalytic layer 180, and the metal layer ML is then patterned to form the peripheral traces 120 and the marks 140. In some embodiments of this disclosure, the peripheral traces 120 and the marks 140 can be made of metal materials with good conductivity. For example, the peripheral traces 120 and the marks 140 can be made from a single-layer metal structure (e.g., a silver layer, a copper layer, or the likes) or a multilayer conductive structure (e.g., Molybdenum (Mo)/ Aluminum (Al)/Mo, Copper (Cu)/Nickel (Ni), Titanium (Ti)/Al/Ti, Mo/Chromium (Cr), or the likes). These metal structures are opaque in some embodiments. For example, the transmission of visible light (400 nm-700 nm) for the metal layer ML is less than about 90%.

In this embodiment, the metal layer ML of copper layer is deposited on the catalytic layer 180 by a chemical-plating process. Since the catalytic layer 180 is not formed on the display area VA is, the copper layer is controlled to be deposited/formed on the peripheral area PA only. The chemical plating process is to reduce the metal ions in the plating solution to metal by the metal catalyst for plating on the surface under the circumstance of proper reducing agent without any applied electrical current. This process is called electroless plating, chemical plating, or autocatalytic plating. Therefore, the metal layer ML of the present embodiment may also be referred to as an electroless plating layer, a chemical plating layer or an autocatalytic plating layer. For example, a plating solution having a main component of copper sulfate may be used, and the composition may be, for example but not limited to, 5 g/L copper sulfate, 12 g/L ethylenediamine tetraacetic acid, and 5 g/L formaldehyde. The pH value of the electroless copper plating solution is about 11 to 13 with sodium hydroxide, the plating bath temperature is about 50 to 70° C., and the immersion reaction time is 1 to 5 minutes. During the electroless plating reaction, the copper material can be nucleated on the catalytic layer 180 having catalytic/activating ability, and then self-catalyzed by copper to continuously grow as the copper film/layer.

Afterwards, as shown in FIG. 1C, a metal nanowire layer NWL at least comprising metal nanowires, such as silver nanowire layers, gold nanowire layers or copper nanowire layers, is formed on both the peripheral area PA and the display area VA. The portion (i.e., the first portion) of the metal nanowire layer NWL on the display area VA is formed on the substrate 110, and the portion (i.e., the second portion) of the metal nanowire layer NWL in the peripheral area PA is formed on the metal layer ML. In this embodiment, a dispersion solution or ink containing the metal nanowires is formed on the substrate 110 by coating, and then the coated layer of metal nanowires is dried to form the metal nanowire layer NWL on the surfaces of the substrate 110 and the metal layer ML. After the curing/drying step described above, the solvent or the like of the ink is evaporated, and the metal nanowires are distributed in a random manner on the surfaces of the substrate 110 and the metal layer ML. The metal nanowires are fixed to the surfaces of the substrate 110 and the metal layer ML, thereby forming the metal nanowire layer NWL. The metal nanowires can be in contact with each other to provide a continuous current path, thereby forming a conductive network.

In this embodiment, the above-mentioned dispersion solution or ink may comprise water, alcohol, ketone, ether, hydrocarbon or aromatic solvent (e.g., benzene, toluene, xylene, etc.). The above-mentioned dispersion solution may also comprise additives, surfactants or binders, such as carboxymethyl cellulose (CMC), 2-hydroxyethyl cellulose (HEC), hydroxypropyl methylcellulose (HPMC), sulfonate, sulfate, disulfonate, sulfo succinate, phosphate or fluorosurfactant and the likes. The dispersion solution or ink containing metal nanowires may be formed on the surfaces of the substrate 110 and the metal layer ML by any means, such as, but not limited to, screen printing, nozzle coating, roller coating, and the likes. In another embodiment, the dispersion solution or ink containing metal nanowires may be applied to the surfaces of the continuously supplied substrate 110 and the foregoing metal layer ML by a roll to roll (RTR) process.

As used herein, "metal nanowire(s)" is a collective term referring to a collection of metal nanowires comprising a plurality of elemental metals, metal alloys or metal compounds (including metal oxides). The number of the contained metal nanowires does not affect the claimed scope of the present disclosure. At least one cross-sectional dimension (i.e., the diameter of the cross-section) of the single metal nanowire is less than about 500 nm, or less than about 100 nm, or less than about 50 nm. The metal nanostructure referred to in the present disclosure as "wire(s)" mainly has a high aspect ratio (length:diameter of the cross-section), for example, between about 10 and 100,000. Alternatively, the aspect ratio of the metal nanowire may be greater than about 10, or greater than about 50, or greater than about 100. The metal nanowire may be any metal including, for example but not limited to, silver, gold, copper, nickel, or gold plated silver. Other terms, such as silk, fiber, tube, etc., if they have the above-mentioned dimensions and high aspect ratio, are also within the scope of the present disclosure.

Then, the patterning step is performed. In one embodiment, an etchant that can simultaneously etch the metal nanowire layer NWL and the metal layer ML is applied for forming the first cover layers C1, the second cover layers C2, the peripheral traces 120 and the marks 140 in one manufacturing process. In this embodiment, the patterning process may comprise the following steps. First, the photosensitive material (e.g., a photoresist material) is formed and then is exposed/developed (i.e., the well-known lithography process) to define a pattern of the peripheral traces 120 and the marks 140 located in the peripheral area PA. Then, the etching process is performed to etch the metal nanowire layer NWL so as to form the first cover layers C1 and the second cover layers C2 from, and also to etch the metal layer ML so as to form the peripheral traces 120 on the peripheral area PA (see FIGS. 2, 2A and 2B).

In one embodiment, the metal nanowire layer NWL is a silver nanowire layer, and the metal layer ML is a copper layer. The etchant can etch both of copper and silver. For example, the main components of the etchant comprise $H_3PO_4$ (about 5%~15%) and $HNO_3$ (about 55%~70%) for patterning the copper layer and the silver nanowire layer in the same manufacturing process. In another embodiment, the etchant is further added with additives such as an etching selectivity adjusting agent for adjusting the etching rates of copper and silver. For example, it may be added in the main components of $H_3PO_4$ (about 5%~15%) and $HNO_3$ (about 55%~70%) with 5%~10% Benzotriazole (BTA) to prevent the over-etching of copper.

The patterning step further comprises to simultaneously pattern the metal nanowire layer NWL on the display area VA. In other words, the first portion of the metal nanowire layer NWL on the display area VA is patterned by using the above-mentioned etchant to form the touch sensing electrodes TE on the display area VA, and the touch sensing electrodes TE can be electrically connected to the peripheral traces 120. In other words, the touch sensing electrodes TE is made from the metal nanowire layer NWL at least including the metal nanowires. That is, after the patterning step, the metal nanowire layer NWL is patterned to form the touch sensing electrodes TE in the display area VA and to form the first cover layers C1 in the peripheral area PA. Accordingly, the touch sensing electrodes TE can be electrically connected to the peripheral traces 120 by the contact of the first cover layers C1 with the peripheral traces 120, thereby achieving the signal transmission therebetween. In addition, the metal nanowire layer NWL also is also patterned to form the second cover layers C2 in the peripheral area PA, which is disposed on the top surfaces 144 of the marks 140. The marks 140 can be widely interpreted as a non-electrical function pattern, but this disclosure is not limit thereto. In some embodiments of the present disclosure, the peripheral traces 120 and the marks 140 may be made of the same layer of the metal layer ML. For example, both the peripheral traces 120 and the marks 140 are made of the same electroless copper plating layer), and the touch sensing electrodes TE, the first cover layers C1 and the second cover layers C2 may be made of the same layer of the metal nanowire layer NWL.

In one modified embodiment, the first portion of the metal nanowire layer NWL located in the display area VA and the second portion located in the peripheral area PA can be patterned by different etching steps (i.e., using different etchants).

Figure 2A:
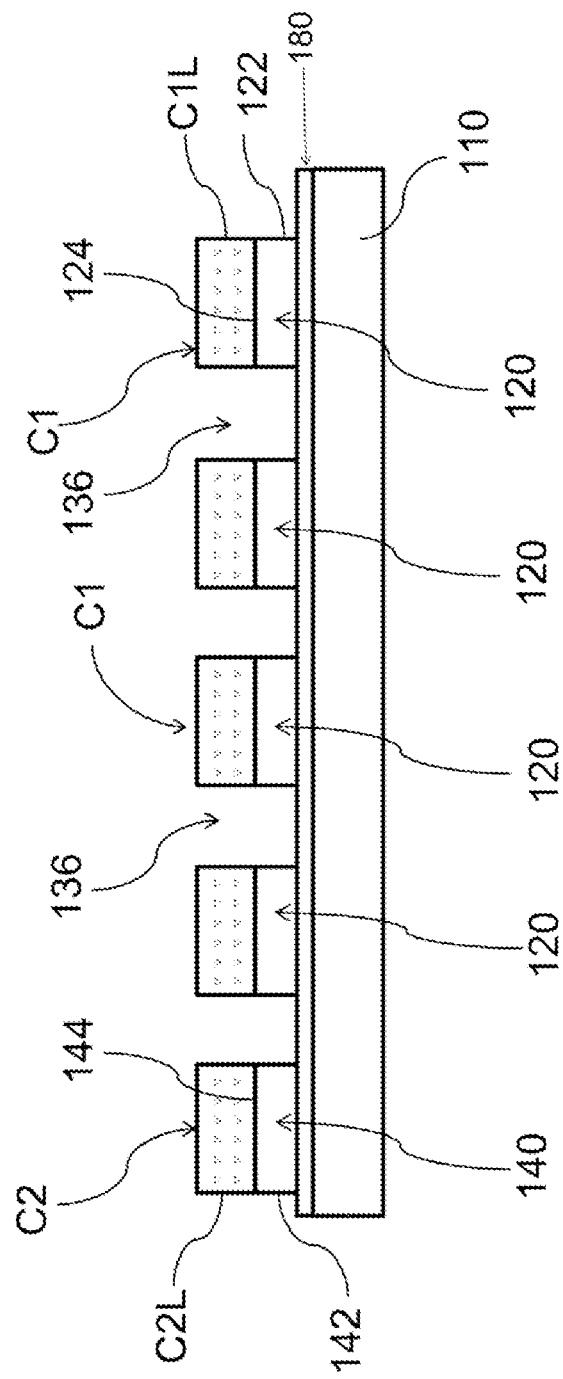
FIG. 2A is a sectional view along the line A-A of FIG. 2.
Figure 2B:
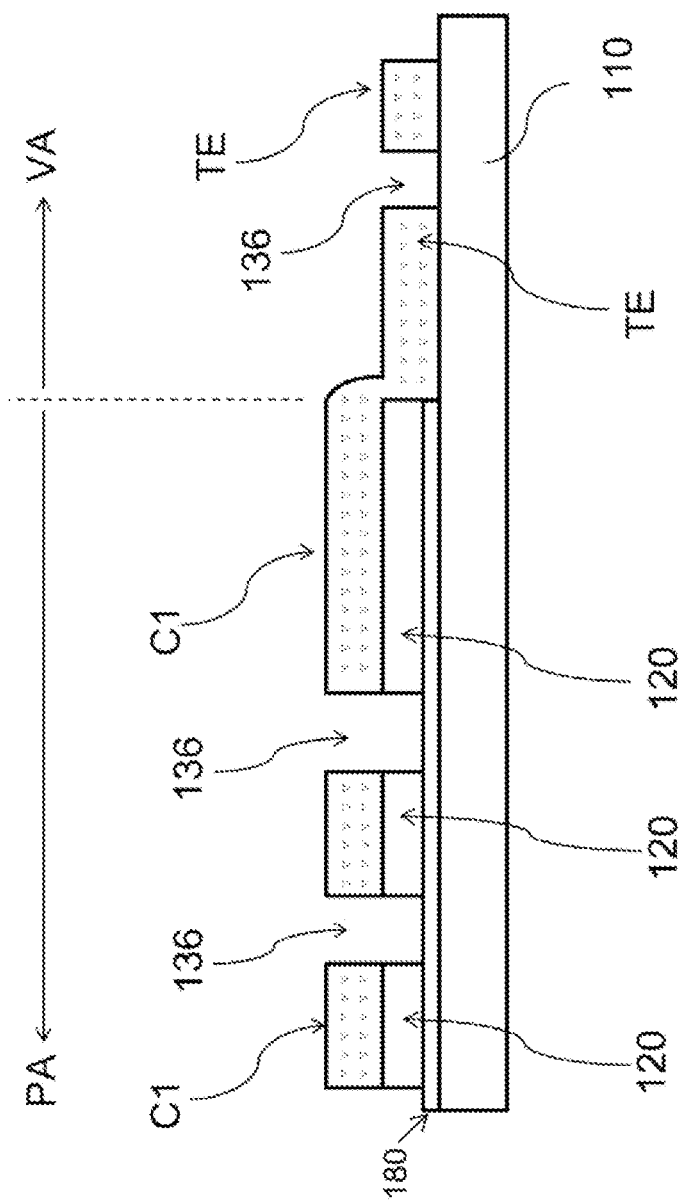
FIG. 2B is a sectional view along the line B-B of FIG. 2.

FIG. 2 is a top view of the touch panel 100 according to an embodiment of this disclosure, FIG. 2A is a sectional view along the line A-A of FIG. 2, and FIG. 2B is a sectional view along the line B-B of FIG. 2. Referring to FIG. 2A, the peripheral traces 120 and the marks 140 are substantially disposed on the catalytic layer 180, and the first cover layers C1 and the second cover layers C2 are formed on the top surfaces 124 of the peripheral traces 120 and the top surfaces 144 of the marks 140, respectively. In some embodiments of this disclosure, the metal nanowires are silver nanowires. For the sake of simplicity, the sectional view of the peripheral traces 120 and the marks 140 is a quadrilateral (e.g., the rectangle shapes shown in FIG. 1A). To be noted, the structures and amounts of the side walls 122 and the top surfaces 124 of the peripheral traces 120 and the side walls 142 and the top surfaces 144 of the marks 140 can be changed based on the actual application and are not limited to the descriptions and drawings of this disclosure.

In this embodiment, the marks 140 are disposed on the bonding area BA of the peripheral area PA, and the marks 140 are bonding alignment marks. In more detailed, the marks 140 are configured to align an external circuit board 170 (e.g., a flexible circuit board, FPC) and the touch panel 100 in a bonding step. To be noted, the position and function of the marks 140 is not limited. For example, the marks 140 can be any of the checking marks, patterns, or numbers. The marks 140 can have any possible shape such as a circle, a quadrilateral, a cross, an L shape, a T shape, or the likes. In addition, the parts of the peripheral traces 120 extending to the bonding area BA are named as bonding sections. As mentioned in the previous embodiment, the top surfaces of the bonding sections in the bonding area BA are also covered by the first cover layers C1.

As shown in FIGS. 2A and 2B, in the peripheral area PA, a non-conductive area 136 is provided between two adjacent peripheral traces 120 for electrically isolating the adjacent peripheral traces 120 and preventing from the short circuit between the adjacent peripheral traces 120. In other words, the non-conductive area 136 is defined between the side walls 122 of the adjacent peripheral traces 120. In this embodiment, the non-conductive area 136 is a air gap for isolating the adjacent peripheral traces 120. In the step of forming the first cover layers C1 on the peripheral traces 120, the air gaps are formed by the mentioned etch step, so that the side wall 122 of the peripheral trace 120 and the corresponding side surface C1L of the first cover layer C1 are a coplanar surface formed by the mentioned etch step and are aligned with each other. That is, the side wall 122 of the peripheral trace 120 and the corresponding side surface C1L of the first cover layer C1 are co-etched surface which is formed in the same etching step. Similarly, the side wall 142 of the mark 140 and the corresponding side surface C2L of the second cover layer C2 are a coplanar surface formed by the mentioned etch step and are aligned to each other. As defined, the side wall 142 of the mark 140 and the corresponding side surface C2L of the second cover layer C2 are co-etched surface which is formed in the same etching step. In one embodiment, there are no metal nanowires formed on or protruded from the side walls 122 of the peripheral traces 122 and the side walls 142 of the marks 140 after the above-mentioned etching step. In more detailed, in the bonding area BA as shown in FIG. 2A, the non-conductive area 136 is formed between two adjacent bonding sections, and the side wall 122 of the bonding section and the side surface C1L of the first cover layer C1 are a co-etched surface. Moreover, the peripheral traces 120 and the first cover layers C1 have the same or similar pattern and dimension. For example, the peripheral traces 120 and the first cover layers C1 can both have a stripe pattern with the same or similar widths. In addition, the marks 140 and the second cover layers C2 also have the same or similar pattern and dimension. For example, the marks 140 and the second cover layers C2 can be circles with the same or similar radiuses, or they are quadrilaterals with the same or similar lengths, or any of other the same or similar patterns (e.g., crosses, L shapes, T shapes, or the likes).

As shown in FIG. 2B, in the display area VA, a non-conductive area 136 is provided between two adjacent touch sensing electrodes TE for electrically isolating the adjacent touch sensing electrodes TE and preventing from the short circuit thereof. In other words, the non-conductive area 136 is disposed between the side walls of the adjacent touch sensing electrodes TE. In this embodiment, the non-conductive area 136 is an air gap for isolating the adjacent touch sensing electrodes TE. Herein, the gaps between the adjacent touch sensing electrodes TE are formed by an etching process. In this embodiment, the touch sensing electrodes TE and the first cover layers C1/second cover layers C2 can be formed from the same metal nanowire layer NWL (e.g. a silver nanowire layer). Accordingly, the metal nanowire layer NWL can form a climbing structure for climb upon the peripheral traces 120 at the boundary of the display area VA and the peripheral area PA. This structure is benefit to the formation of the metal nanowire layer NWL for covering the top surfaces 124 of the peripheral traces 120, thereby forming the first cover layers C1.

In some embodiments of this disclosure, the first cover layers C1 and the second cover layers C2 of the touch panel 100 are disposed on the top surfaces 124 of the peripheral traces 120 and the top surfaces 144 of the marks 140, respectively. Accordingly, the requirement for the alignment tolerance/deviation area in the manufacturing process can be reduced or prevented, thereby decreasing the width of the peripheral area PA so as to achieve the requirement of narrow border displays. In some embodiments, the width of the peripheral traces 120 of the touch panel 100 ranges from about 5 µm to 20 µm, and the distance between adjacent two of the peripheral traces 120 ranges from about 5 µm to 20 µm. In some embodiments, the width of the peripheral traces 120 of the touch panel 100 ranges from about 3 µm to 20 µm, and the distance between adjacent two of the peripheral traces 120 ranges from about 3 µm to 20 µm. Accordingly, the width of the peripheral area PA can be minimized to about less than about 2 mm, so that the dimension of the touch panel 100 can be only 80% of the conventional touch panel or have a larger border.

In some embodiments of this disclosure, when the voltage is 10 volts, the resistance value between adjacent two peripheral traces 120 of the touch panel 100 is greater than about $1\times10^3$ ohm According to Ohm's law, the leakage current between the adjacent two peripheral traces 120 is less than about $1\times10^{-2}$ ampere (A). In some embodiments, the resistance value between adjacent two peripheral traces 120 of the touch panel 100 is greater than about $1\times10^7$ ohm, and the leakage current between the adjacent two peripheral traces 120 is less than about $2\times10^{-6}$ A. In some embodiments, the resistance value between adjacent two peripheral traces 120 of the touch panel 100 is greater than about $1\times10^8$ ohm, and the leakage current between the adjacent two peripheral traces 120 is less than about $2\times10^{-7}$ A. Therefore, the touch panel of this embodiment can provide for improved electrical property and the touch sensitivity.

Figure 3:
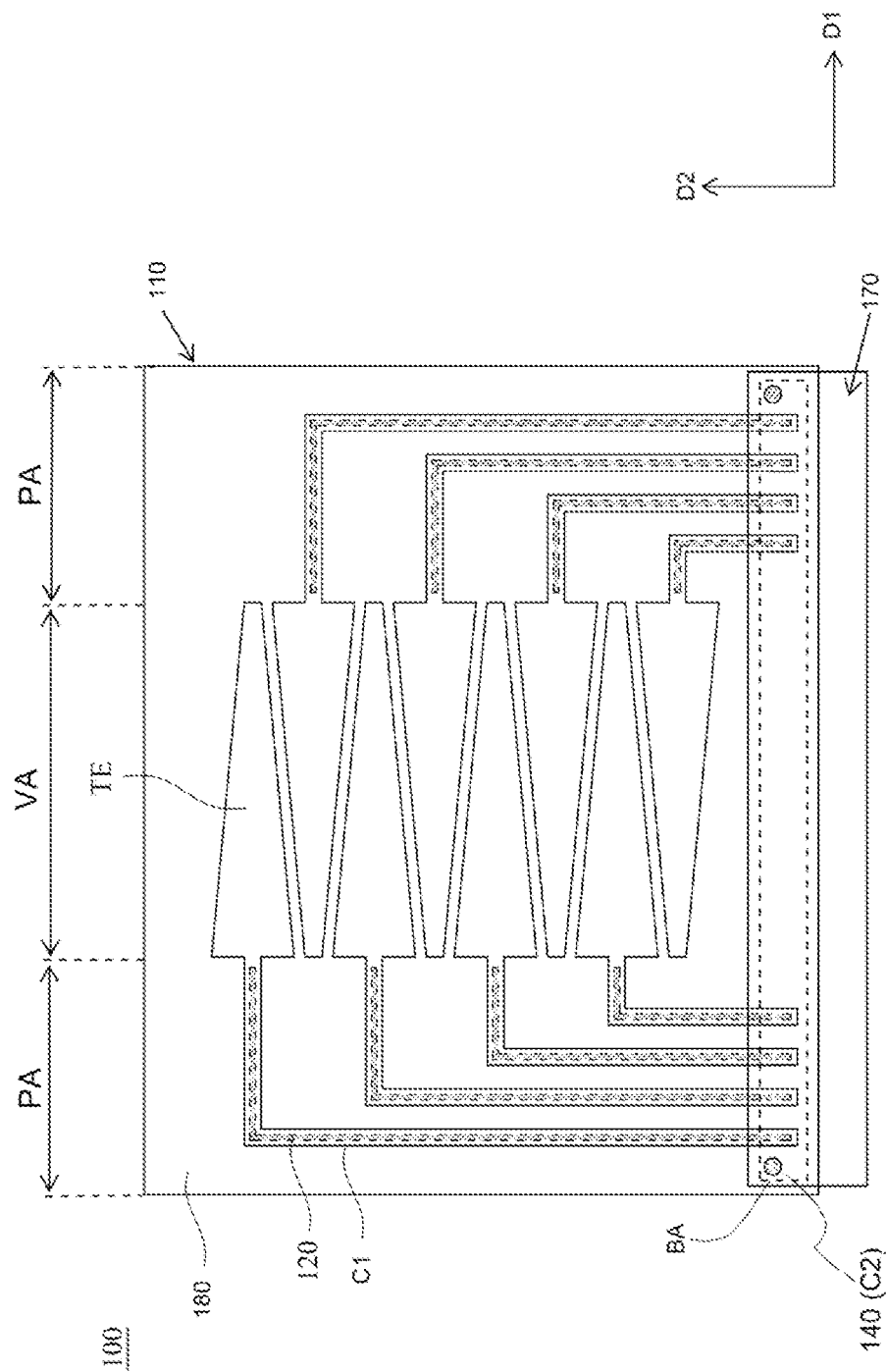
FIG. 3 is a top view of assembled touch panel and flexible circuit board according to some embodiments of this disclosure.

FIG. 3 shows the aligned and assembled structure of the flexible circuit board 170 and the touch panel 100. The electrode pads (not shown) of the flexible circuit board 170 can be electrically connected to the peripheral traces 120 in the bonding area BA of the substrate 110 through the conductive paste (not shown, e.g., Anisotropic conductive adhesive/paste (ACA/ACP)). In some embodiments, the first cover layers C1 in the bonding area BA can be formed with an opening (not shown) for exposing the peripheral traces 120, and the conductive paste (e.g. ACP) can be applied to the opening of the first cover layers C1 to directly contact the peripheral traces 120, thereby forming the conductive path. In this embodiment, the touch sensing electrodes TE are non-cross arranged. For example, the touch sensing electrodes TE are conducting bars extending along a first direction D1, which are not intersected with each other. In other embodiments, the touch sensing electrodes TE can have proper shape and are not limited to the scope of this disclosure. In this embodiment, the touch sensing electrodes TE have a single-layer structure, so that the touch position can be determined by detecting the variations of the capacitances of the touch sensing electrodes TE.

Figure 4A:
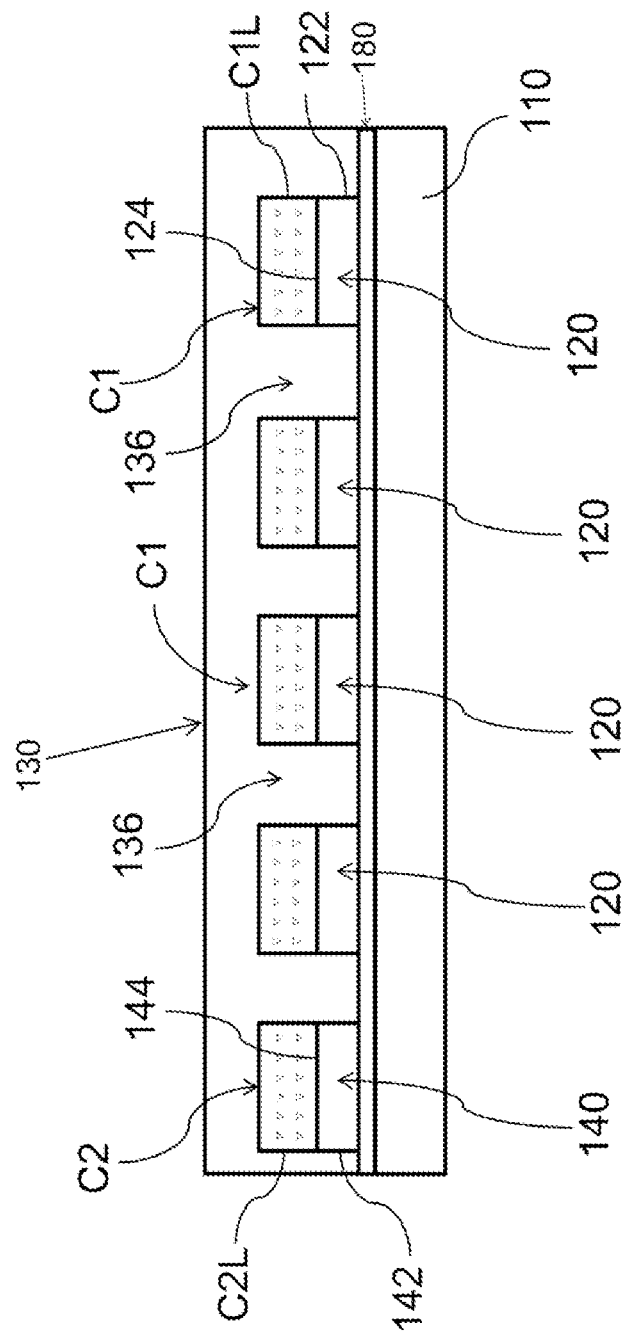
FIG. 4A is a sectional view along the line A-A of an modified embodiment of FIG. 2.
Figure 4B:
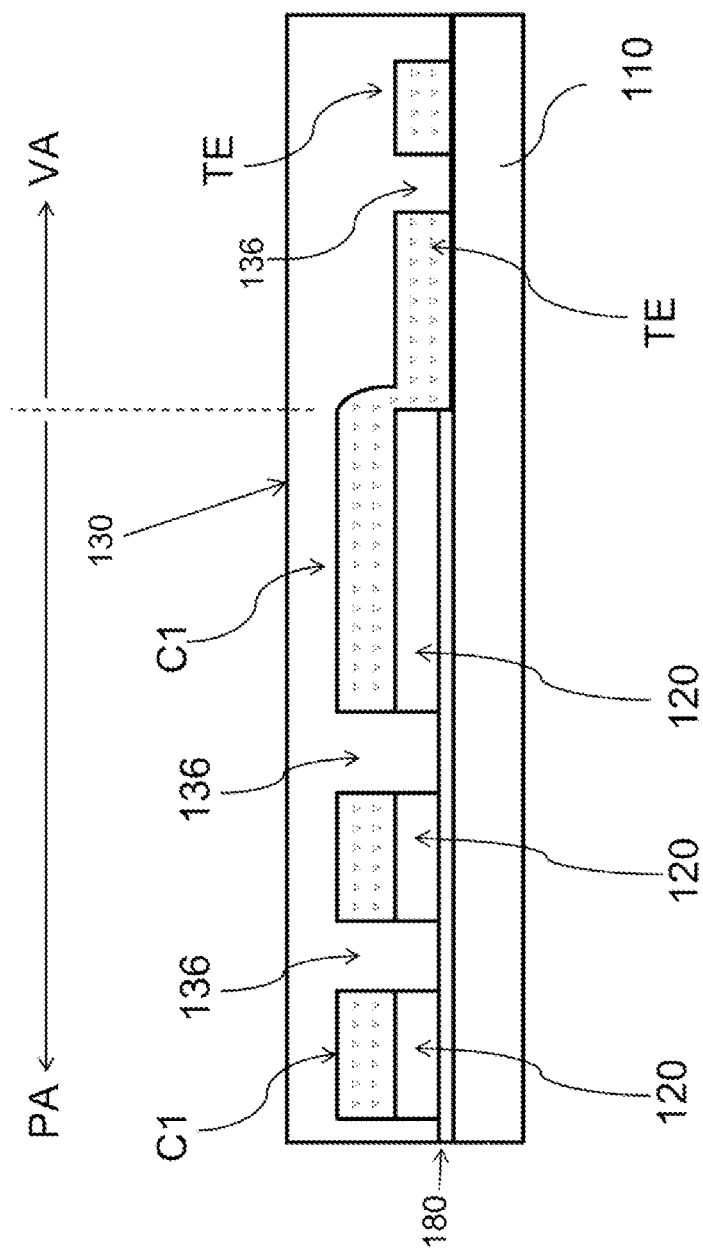
FIG. 4B is a sectional view along the line B-B of an modified embodiment of FIG. 2.

In one embodiment, the touch panel 100 further comprises a film layer 130. FIG. 4A is a sectional view along the line A-A of FIG. 1, which is further formed with the film layer 130, and FIG. 4B is a sectional view along the line B-B of FIG. 1, which is further formed with the film layer 130. In one embodiment, the film layer 130 entirely covers the touch panel 100. That is, the film layer 130 covers the touch sensing electrodes TE, the first cover layers C1, and the second cover layers C2. As shown in FIGS. 4A and 4B, in the peripheral area PA, the film layer 130 covers the first cover layers C1 and the second cover layers C2, and the film layer 130 is further filled the space between the adjacent peripheral traces 120. In other words, a filling layer, which has the same material as the film layer 130, is formed in the mentioned air gap to define a non-conductive area 136 between the adjacent peripheral traces 120 for isolating the adjacent peripheral traces 120. The film layer 130 further covers the catalytic layer 180 exposed from the non-conductive area 136. Moreover, regarding to a layered set of peripheral trace 120 and first cover layer C1, the film layer 130 can cover the entire structure of the stacked peripheral trace 120 and first cover layer C1. In detail, the film layer 130 can cover and contact the top surface of the first cover layer C1, the side wall of the peripheral trace 120, and the side surface C1L of the first cover layer C1. That is, each peripheral trace 120 has a side wall 122 and a top surface 124, each first cover layer C1 has a side surface C1L, and the side surface C1L and the side wall 122 are aligned with each other and both contact the filling layer (or the film layer 130). The first cover layer C1 contacts the top surface 124 of the corresponding peripheral trace 120. Similarly, regarding to a layered set of mark 140 and second cover layer C2, the film layer 130 can cover the entire structure of the stacked mark 140 and second cover layer C2. In detail, the film layer 130 can cover and contact the top surface of the second cover layer C2, the side wall 142 of the mark 140, and the side surface C2L of the second cover layer C2. That is, each mark 140 has a side wall 142 and a top surface 144, each second cover layer C2 has a side surface C2L, and the side surface C2L and the side wall 142 are aligned with each other and both contact the filling layer (or the film layer 130). The second cover layer C2 contacts the top surface 144 of the corresponding mark 140.

As shown in FIG. 4B, in the display area VA, the film layer 130 covers the touch sensing electrodes TE, and the film layer 130 is filled in space between the adjacent touch sensing electrodes TE. In other words, a filling layer, which has the same material as the film layer 130, is formed in the mentioned air gap to define a non-conductive area 136 between the adjacent touch sensing electrodes TE for isolating the adjacent touch sensing electrodes TE.

In this embodiment, the composite structure of the touch sensing electrodes TE and the film layer 130 in the display area VA is preferably electrical conductive and light transmission. For example, the transmission of the composite structure (for the visible light, about 400 nm~700 nm) is greater than about 80%, and the surface resistance thereof is between about 10 and 1000 ohm/square. Alternatively, the transmission of the composite structure is greater than about 85%, and the surface resistance thereof is between about 50 and 500 ohm/square.

In some embodiments, the film layer 130 is made of PE (polyethylene), PP (polypropylene), PVB (polyvinyl butyral), PC (polycarbonate), ABS (acrylonitrile butadiene styrene), PEDOT, PSS, ceramic material or the likes. In one embodiment of this disclosure, the film layer 130 can be, for example but not limited to, any of the following polymers: polyacrylic resins such as polymethacrylate (e.g., poly(methyl methacrylate)), polyacrylate and polyacrylonitrile; polyvinyl alcohol; polyester (e.g. polyethylene terephthalate (PET), polyester naphthalate, and polycarbonate); polymers with high aromaticity such as phenolic resin or cresol-formaldehyde, polystyrene, polyvinyltoluene, polyvinyl xylene, polyfluorene imine, polyamine, polyamidimide, polyether phthalimide, polysulfide, polyfluorene, polyphenylene and polyphenyl ether; polyurethane (PU); epoxy resin; polyolefin (e.g., polypropylene, polymethylpentene, and cyclicolefin); cellulose; polyfluorene and other Si-containing polymers (e.g., polyoctene sulfoxide and polydecane); polyvinyl chloride (PVC); polyacetate; polynorbornene; synthetic rubber (e.g., ethylene-propylene rubber (EPR), styrene-butadiene rubber (SBR), ethylene-propylene-diene monomer (EPDM)); and fluoropolymers (e.g., polyvinylidene fluoride, polytetrafluoroethylene (TFE), polyhexafluoropropylene), or a copolymer of fluorine-olefin and hydrocarbon olefin. In other embodiments, the film layer 130 can be made of inorganic materials such as silicon dioxide, mullite, alumina, SiC, carbon fiber, MgO—$Al_2O_3$—$SiO_2$, $Al_2O_3$—$SiO_2$, or MgO—$Al_2O_3$—$SiO_2$—$Li_2O$.

In addition, the above-mentioned film layer 130 and the metal nanowire layers (e.g., the first cover layers C1, the second cover layers C2 or the touch sensing electrodes TE) can form a composite structure having some specific chemical, mechanical and optical properties. For example, the first cover layers C1, the second cover layers C2 and the substrate 110 can be provided with the adhesive property or a desired physical mechanical strength. Thus, the film layer 130 can be used as a matrix. Besides, the film layer 130 can be made of some specific polymers for providing additional protections (e.g., anti-scratch and anti-wear) to the touch sensing electrodes TE, the first cover layers C1 and/or the second cover layers C2. In this case, the film layer 130 can be functioned as a hard coat. For example, when the film layer 130 can be made of polyacrylate, epoxy resin, polyurethane, polydecane, polyoxo, or poly(Si-acrylic), the touch sensing electrodes TE, the first cover layers C1 and/or the second cover layers C2 can have higher surface strength for increasing the anti-scratch ability. Moreover, the film layer 130 can be further added with UV stabilizers for enhancing the anti-UV ability of the touch sensing electrodes TE, the first cover layers C1 and/or the second cover layers C2. To be noted, the above examples only provide some possible additional functions or names of the film layer 130, and are not to limit the scope of this disclosure. In the drawings, the film layer 130 and the metal nanowire layers (e.g., the first cover layers C1, the second cover layers C2 or the touch sensing electrodes TE) are shown as different layers in the present drawings. However, the material of the film layer 130 may penetrate into the spaces between the metal nanowires before curing the material of the film layer 130. After a curing step, the metal nanowires can be embedded into the film layer 130 to form a composite layer. In other words, the structure and configuration of the film layer 130 and the metal nanowire layer NWL (e.g. the first cover layers C1, the second cover layers C2, and/or the touch sensing electrodes TE) are not limited to the present drawings.

Figure 5:
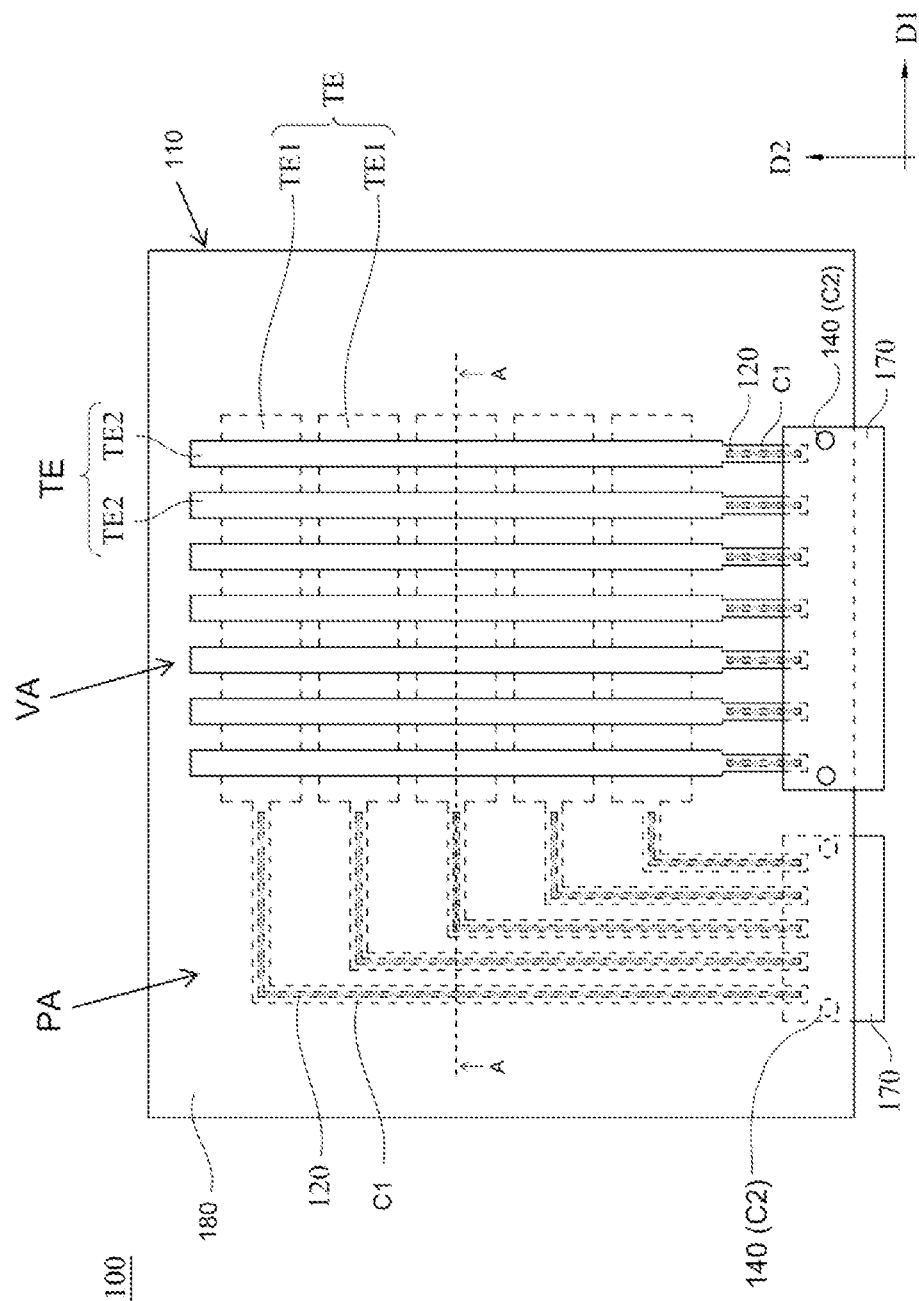
FIG. 5 is a top view of a touch panel according to another embodiment of this disclosure.

FIG. 5 is a top view of the touch panel 100 according to some embodiments of this disclosure. The embodiment of FIG. 5 is similar to the embodiment of FIG. 2. The touch sensing electrodes TE of the embodiment of FIG. 5 have a double layer configuration.

Figure 5A:
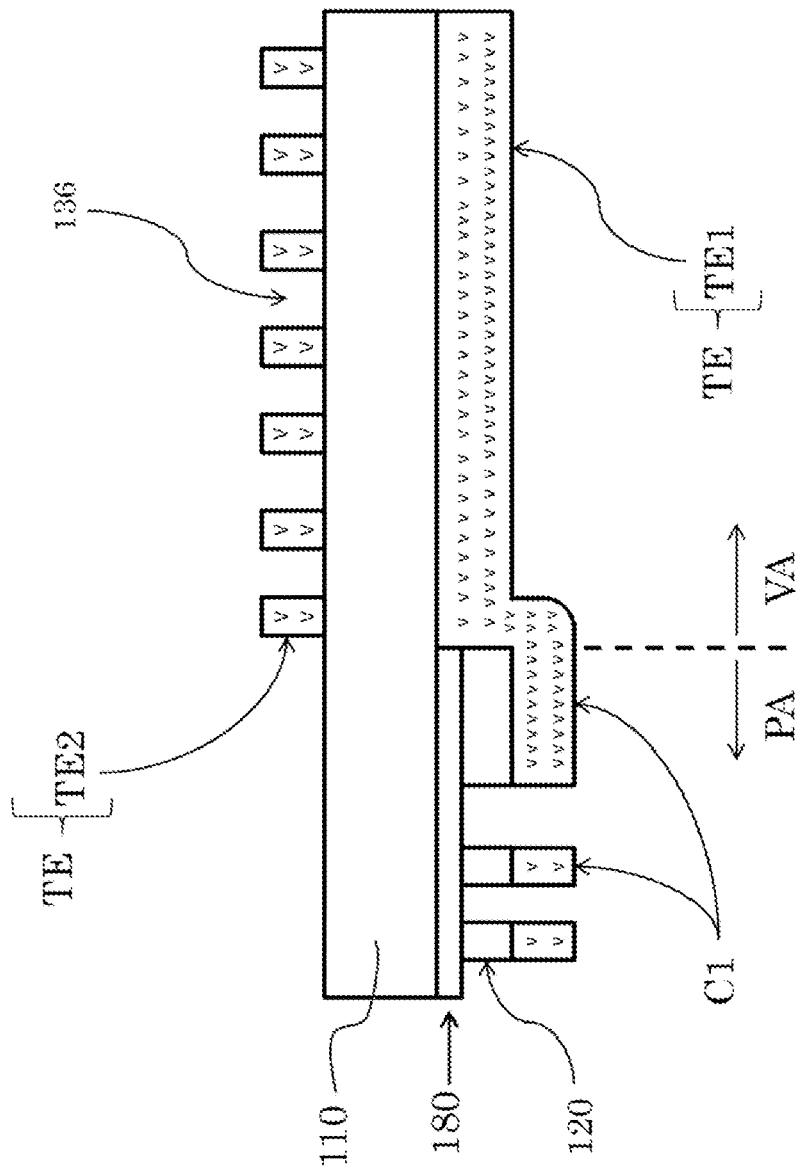
FIG. 5A is a sectional view along the line A-A of FIG. 5.

The configuration of first touch sensing electrodes TE1 and second touch sensing electrodes TE2 is used in this embodiment for discussing the embodiment of FIG. 5. Referring to FIG. 5A, similar to the above embodiment, the catalytic layer 180 is disposed on the peripheral area PA and located on the opposite two surfaces of the substrate 110. The first touch sensing electrodes TE1 are formed on one surface (e.g., the bottom surface) of the substrate 110, and the second touch sensing electrodes TE2 are formed on another surface (e.g., the top surface) of the substrate 110.

Thus, the first touch sensing electrodes TE1 and the second touch sensing electrodes TE2 are electrically isolated from each other. Some peripheral traces 120 formed on the bottom surface are connected to the first touch sensing electrodes TE1, and some marks 140 are disposed on the bottom surface of the substrate 110. In addition, the first cover layers C1 are formed on these peripheral traces 120, and the second cover layers C2 are formed on the marks 140. Similarly, some peripheral traces 120 formed on the top surface are connected to the second touch sensing electrodes TE2, and some marks 140 are disposed on the top surface of the substrate 110. In addition, the first cover layers C1 are formed on these peripheral traces 120, and the second cover layers C2 are formed on the marks 140. The first touch sensing electrodes TE1 are bar-shape electrodes extending along a first direction D1, and the second touch sensing electrodes TE2 are bar-shape electrodes extending along a second direction D2. The extension direction of the first touch sensing electrodes TE1 and the extension direction of the second touch sensing electrodes TE2 are different from each other and are intersected with each other. The first touch sensing electrodes TE1 and the second touch sensing electrodes TE2 are configured for transmitting control signals and receiving touch sensing signals, respectively. Accordingly, the touch position can be obtained by detecting the signal changes between the first touch sensing electrodes TE1 and the second touch sensing electrodes TE2. For example, capacitance between the first touch sensing electrodes TE1 and the second touch sensing electrodes TE2 changes when object touches the device. Based on this configuration, the user can perform the desired touch control on the substrate 110. In addition, the touch panel 100 can further comprise a film layer 130, which entirely covers the touch panel 100. In other words, the top and bottom surfaces of the substrate 100 are both configured with a film layer 130, which covers the first touch sensing electrodes TE1, the second touch sensing electrodes TE2, the first cover layers C1 and the second cover layers C2. Moreover, the non-conductive area 136 on two surfaces of the substrate 110 is filled with the material of film layers 130, and the film layers 130 can cover the exposed catalytic layers 180.

In some embodiments, the double-surface touch panel 100 can be manufactured by the following steps. First, for example, two catalytic layers 180, two metal layers ML and two metal nanowire layers NWL are formed on the two opposite surfaces of the substrate 110, respectively. Then, the double-sided exposure and development processes are performed to form the patterned first touch sensing electrodes TE1, second touch sensing electrodes TE2, marks 140 and peripheral traces 120 on the two opposite surfaces of the substrate 110, respectively.

In one embodiment, the exposure process can utilize a light source with multiple timings to expose/develop the photoresist materials on two surfaces of the substrate 110 so as to prevent the interference between the exposures of the two surfaces. In another embodiment, the exposure process can utilize light sources with different wavelengths. In another embodiment, at least one of the catalytic layers 180, metal layers ML and metal nanowire layers NWL formed on two surfaces of the substrate 110 can be added with UV blocking particles or UV absorbing particles, so that the exposure process can be performed by the two UV light sources of same wavelength for patterning the related layers. In this case, the UV blocking particles or UV absorbing particles can absorb a part of the UV light in a specific wavelength (e.g., at least 10%, 20%, 25% or 20-50% of UV light), and can substantially allow the visible light (e.g., 400-700 nm) to pass through. For example, 85% of visible light can pass through the layers or the stackup. In one embodiment, the UV absorbing particles can be 2-(2H-benzotriazol-2-yl)-4,6-bis(1-methyl-1-phenylethyl) phenol (Tinuvin® 234), 2,2'-methylene-bis(6-(2H-benzotriazol-2-yl)-4-(1,1,3,3-tetramethylbutyl) phenol (Tinuvin® 360), and the concentration of the added UV absorbing particles is about from about 1 wt % to 5 wt %.

Figure 6:
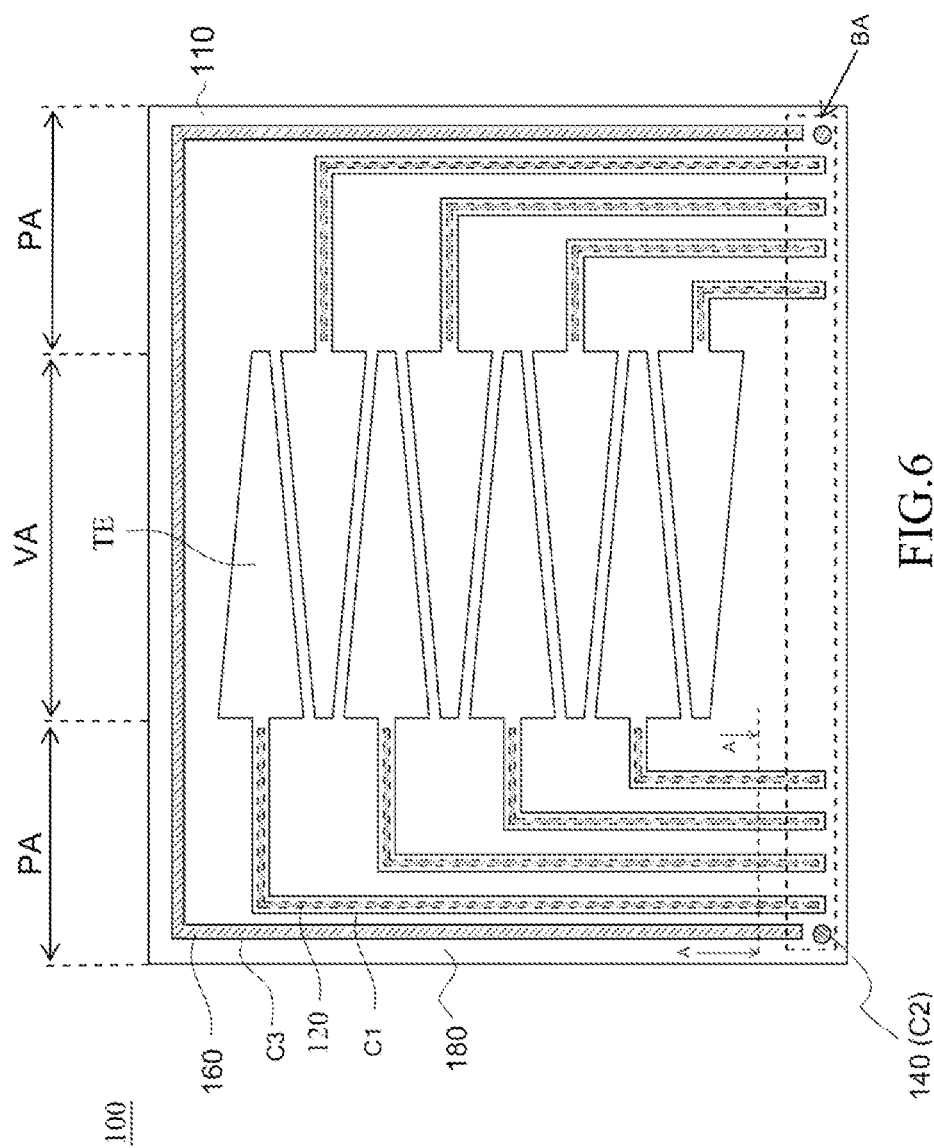
FIG. 6 is a sectional view of a touch panel according to another embodiment of this disclosure.
Figure 6A:
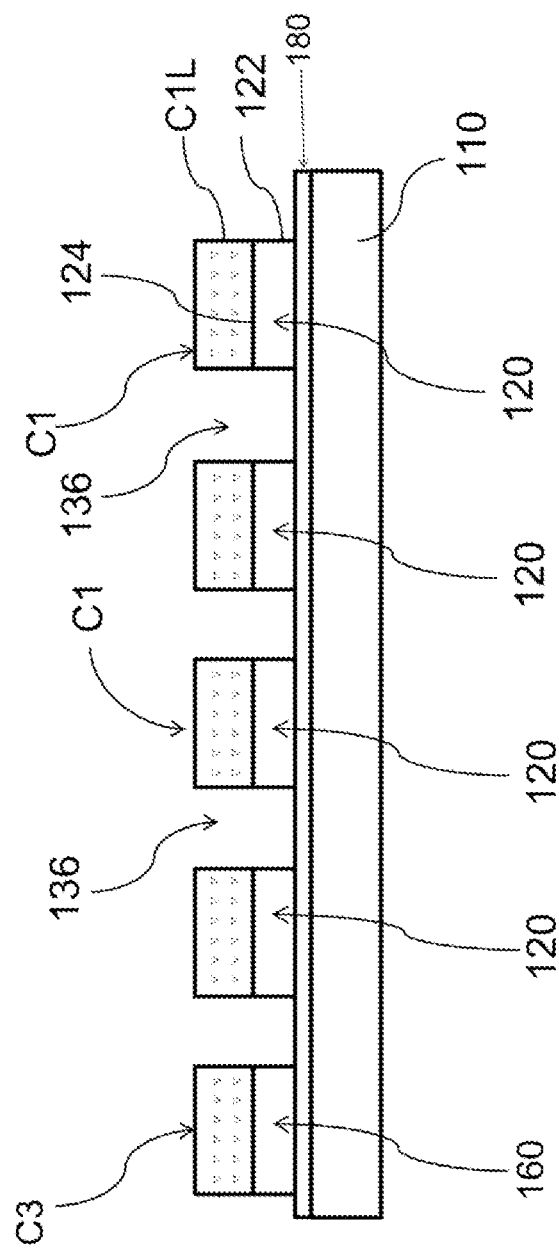
FIG. 6A is a sectional view along the line A-A of FIG. 6.

FIG. 6 is a top view of the touch panel 100 according to some embodiments of this disclosure. The embodiment of FIG. 6 is similar to the embodiment of FIG. 2. The touch panel 100 of the embodiment of FIG. 6 further comprises a shielding conductive line 160 disposed on the peripheral area PA, and a third cover layer C3 is formed on the top surface of the shielding conductive line 160. Referring to FIG. 6A, the shielding conductive line 160 is also formed on the catalytic layer 180 and mainly surrounds the touch sensing electrodes TE and the peripheral traces 120. The shielding conductive line 160 extends to the bonding area BA and electrically connects to the ground terminal of the flexible circuit board 170. Accordingly, the shielding conductive line 160 can shield or eliminate the signal interference or provide ESD protection, such as in particular, the small current change induced when the connecting wires around the touch device is contacted by hands.

The shielding conductive line 160 can be made by the mentioned metal material, and can be referred to the above description of the peripheral traces 120 or marks 140. The third cover layer C3 is made by the mentioned metal nanowire layer, and can be referred to the above description of the first cover layers C1 or the second cover layers C2. In addition, the specific descriptions of the above embodiments can be also applied to the shielding conductive line 160 and the third cover layer C3 of this embodiment. In some embodiments of this disclosure, the shielding conductive line 160, the peripheral traces 120 and the marks 140 can be made of the same metal layer ML. That is, the shielding conductive line 160, the peripheral traces 120 and the marks 140 are made of the same metal material, such as the aforementioned electroless copper plating layer. The touch sensing electrodes TE, the third cover layer C3, the first cover layers C1 and the second cover layers C2 may be made of the same layer of the metal nanowire layer NWL. In this embodiment, the touch panel 100 further comprises a film layer 130, which entirely covers the touch panel 100. That is, the film layer 130 covers the touch sensing electrodes TE1, the touch sensing electrodes TE2, the first cover layers C1, the second cover layers C2, and the third cover layer C3.

Figure 7:
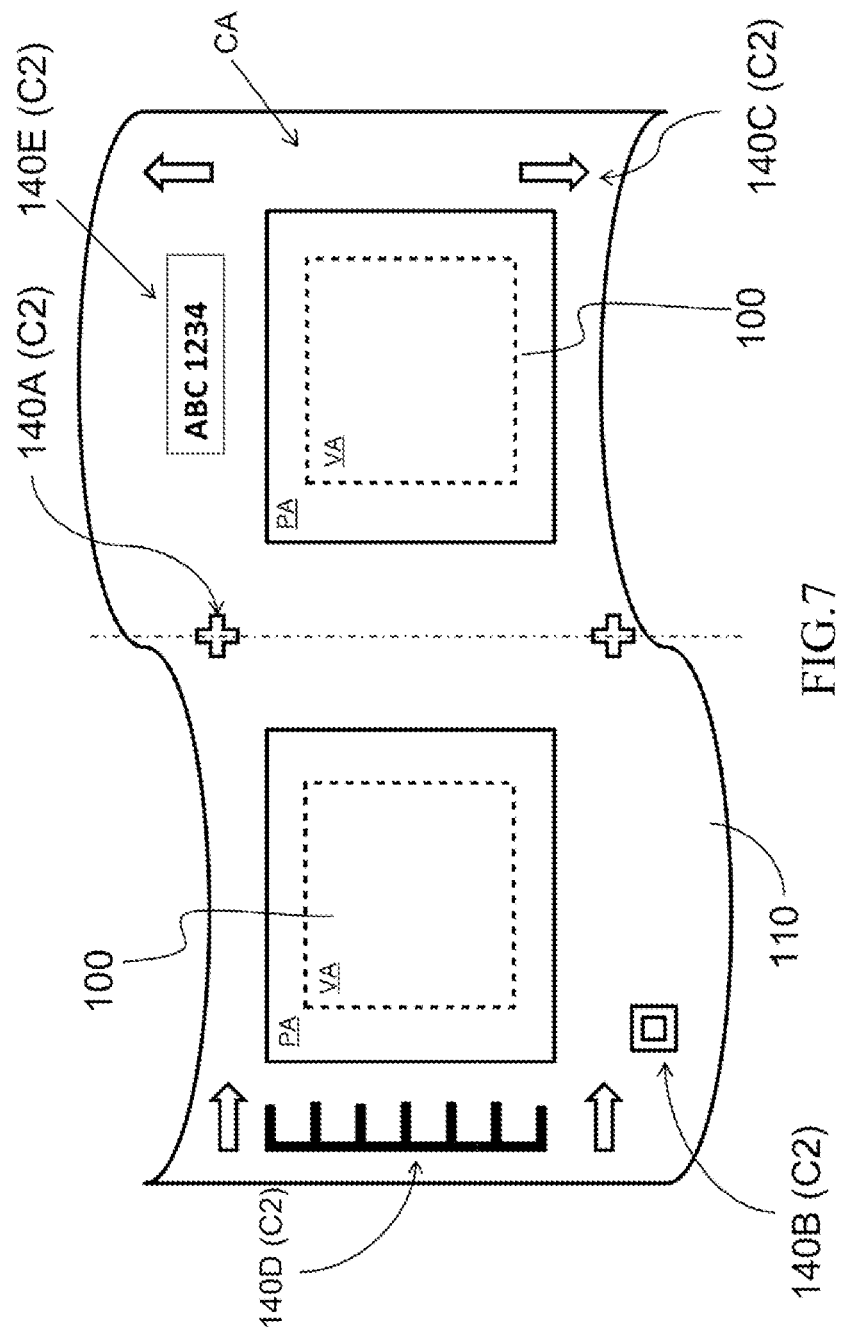
FIG. 7 is a schematic diagram showing a roll sheet of touch sensors according to an embodiment of this disclosure.

In some embodiments, the touch panel 100 can be manufactured by a roll-to-roll process. The roll-to-roll coating process can be performed by the current existing machines and is fully automated, thereby obviously decreasing the manufacturing cost of the touch panel. The specific steps of the roll-to-roll coating process are described hereinafter. First, a roll of flexible substrate 110 is provided between two rollers. The rollers are driven by a motor, so that the substrate 110 can move along the path between two rollers so as to perform the following continuous processes. For example, the catalytic layer 180 can be formed by printing, the metal layer ML can be deposited in the plating tank, the ink containing the metal nanowires can be deposited on the surface of the substrate 110 to form the metal nanowire layer NWL by the storage tank, spray device, coating device and the likes, and the patterning step can be performed by the etching tank or spraying etching agent. Afterwards, the finished touch panels 100 can be rolled into a roll sheet of touch sensors by the product roller. As shown in FIG. 7, in the roll sheet of touch sensors, the surface of the substrate 110 can be fabricated with a plurality of touch panels 100, and the removing area CA is formed on the part of the substrate 110 other than the touch panels 100. The surface of the substrate 110 can be formed with marks 140. In this embodiment, the catalytic layer 180 is disposed on the peripheral area PA and the removing area CA of the touch panel 100. Thus, the peripheral traces 120 of the touch panel 100 are formed on the catalytic layer 180, and the marks 140 are also formed on the catalytic layer 180. The marks 140 can be cutting alignment marks 140A disposed between the touch panels 100 (on the removing area CA), which are mainly used in the cutting/dicing step for cutting/dicing the roll sheet of touch sensors to obtain a plurality of individual touch panels 100. Referring to FIG. 7, the cutting step is to cut the substrate 110 along the cutting line defined by the cutting alignment marks 140A, thereby obtaining two individual touch panels 100. Alternatively, the marks 140 can be alignment marks 140B, direction marks 140C, scale marks 140D, or digital/letter marks 140E. In practice, the alignment marks 140B can be used for alignment in process, the direction marks 140C can be used to mark the process direction (e.g., the MD/TD direction of the substrate 110), the scale marks 140D can be used to mark the scale, and the digital/letter marks 140E can be used to present a specific pattern (e.g., a logo). In other words, the marks 140 of this embodiment can comprise the cutting alignment marks 140A, which are formed on the roll sheet of touch sensors and located between adjacent touch panels 100 (i.e. the removing area CA), or any of the marks 140B to 140E. The marks 140 of this embodiment can also comprise the above-mentioned bonding alignment marks located in the peripheral area PA of the touch panel 100 or any necessary marks for other processes. Similar to the above embodiment, the marks 140A to 140E can be made of metal material and formed on the catalytic layer 180, and the second cover layers C2 are formed on the top surfaces of the marks 140A to 140E. The detailed descriptions of the marks 140A to 140E and the touch panel 100 can be referred to the above embodiments and will be omitted here.

In this embodiment, the roll sheet of touch sensors can further comprise a film layer 130, which entirely covers the uncut touch panels 100 on the roll sheet of touch sensors. That is, the film layer 130 can cover the plurality of touch panels 100, which are not cut yet, on the roll sheet of touch sensors, and then the roll sheet of touch sensors as well as the film layer 130 is cut to obtain individual touch panels 100. Specifically, the film layer 130 can cover the touch sensing electrodes TE, the catalytic layer 180 (including the part of the catalytic layer 180 exposing from the peripheral area PA and the removing area CA), the first cover layers C1 and the second cover layers C2, or the third cover layers C3.

In some embodiments of this disclosure, the substrate 110 is preferably a transparent substrate. Specifically, the substrate 110 can be a rigid transparent substrate or a flexible transparent substrate, and the material thereof can be transparent materials including glass, polymethylmethacrylate (PMMA), polyvinyl chloride (PVC), polypropylene (PP), polyethylene terephthalate (PET), polyethylene naphthalate (PEN), polycarbonate (PC), and polystyrene (PS).

In some embodiments of this disclosure, the film layer 130 is made of an insulation material. For example, the material of the film layer 130 can be a non-conductive resin or any of other organic materials. In some embodiments of this disclosure, the film layer 130 can be formed by spin coating, spraying, printing or the likes. In some embodiments of this disclosure, the thickness of the film layer 130 can range from about 20 nm to 10 μm, or from about 50 nm to 200 nm, or from about 30 nm to 100 nm. For example, the thickness of the film layer 130 can be about 90 nm or 100 nm.

The roll-to-roll production line can adjust the sequence of multiple coating steps as needed along the moving path of the substrate or can be incorporated into any number of additional platforms as desired. For example, in order to achieve a proper post-treatment process, a pressure roller or plasma device can be installed in the production line.

In some embodiments, the formed metal nanowires can be further post-treated to increase their electrical conductivity, and the post-treatment can be a process step comprising, for example, heating, plasma, corona discharge, UV ozone, pressure or a combination of the above processes. For example, after the step of curing the metal nanowire layer NWL, a pressure can be applied thereto by a roller. In one embodiment, one or more rollers are configured to apply a pressure of about 50~3400 psi, or about 100~1000 psi, or about 200~800 psi, or about 300~500 psi, to the metal nanowire layer NWL. The step of applying the pressure is performed before the step of coating the film layer 130. In some embodiments, the post-treatments of heating and pressing can be performed simultaneously. In detailed, the formed metal nanowires can be applied with pressure and heated simultaneously via one or more rollers as described above. For example, the roller can apply a pressure of about 10~500 psi, or about 40~100 psi, and the roller is also heated to between about 70° C. and 200° C., or between about 100° C. and 175° C., thereby enhancing the conductivity of the metal nanowires. In some embodiments, the metal nanowires are preferably exposed to a reducing agent for post-treatment. For example, a metal nanowires composed of silver nanowires are preferably exposed to a silver reducing agent for post-treatment, and the silver reducing agent includes a borohydride (e.g., sodium borohydride), a boron nitrogen compound (e.g., dimethylaminoborane (DMAB)), or a gas reducing agent (e.g., hydrogen ($H_2$)). The exposure time is from about 10 seconds to about 30 minutes, or is from about 1 minute to about 10 minutes.

The other technical features of this embodiment can be referred to the above embodiments, so the detailed descriptions thereof will be omitted.

To be noted, the structure of anyone of the above embodiments can be also applied to another one of the above embodiments, and this disclosure is not limited to the above embodiments.

In some embodiments, the configuration of the catalytic layer can be selectively formed on the predetermined position on the substrate, so that the metal layer is not needed to be entirely formed on the surface of the substrate. This feature can further reduce the manufacturing cost or the material cost.

In some embodiments of this disclosure, the first or second cover layers, which contain metal nanowires, are formed on the peripheral traces and/or marks, so that the preserved tolerance space for the alignment step is not needed, thereby effectively decreasing the width of the peripheral area.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A touch panel, comprising:
   a substrate comprising a display area and a peripheral area;
   a catalytic layer formed on the peripheral area;
   a peripheral trace formed on the catalytic layer, wherein the peripheral trace has a side wall and a top surface;
   a mark formed on the catalytic layer, wherein the mark has a side wall and a top surface;
   a first cover layer and a second cover layer, wherein the first cover layer covers the top surface of the peripheral trace, the second cover layer covers the top surface of the mark, the first cover layer and the second cover layer at least comprise metal nanowires, and the peripheral trace, the mark, the first cover layer and the second cover layer are formed on the peripheral area of the substrate; and
   a touch sensing electrode formed on the display area of the substrate, wherein the touch sensing electrode is electrically connected with the peripheral trace via the first cover layer, wherein the touch sensing electrode, the first cover layer and the second cover layer are made of same metal nanowire layer.

2. The touch panel of claim 1, wherein the catalytic layer is an insulation layer comprising catalytic particles.

3. The touch panel of claim 2, wherein the catalytic particles comprise nanoparticles.

4. The touch panel of claim 1, further comprising a non-conductive area located on the display area and the peripheral area.

5. The touch panel of claim 4, further comprising:
   a film layer formed on the touch sensing electrode, the first cover layer, the second cover layer, and a portion of the catalytic layer in the non-conductive area on the peripheral area.

6. The touch panel of claim 1, wherein the first cover layer has a side surface, and the side surface and the side wall of the peripheral trace are a coplanar surface formed by etching.

7. The touch panel of claim 1, wherein the second cover layer has a side surface, and the side surface and the side wall of the mark are a coplanar surface formed by etching.

8. The touch panel of claim 1, wherein the mark comprises a bonding alignment mark.

9. The touch panel of claim 1, wherein a width of the peripheral trace ranges from 5 µm to 20 µm, and a distance between the peripheral trace and an adjacent peripheral trace ranges from 5 µm to 20 µm.

10. The touch panel of claim 1, wherein the peripheral trace and the mark are made of metal material, and the touch sensing electrode at least comprises the metal nanowires.

11. The touch panel of claim 1, wherein a resistance value between the peripheral trace and an adjacent peripheral trace is greater than $1 \times 10^3$ ohm.

12. A roll sheet of touch sensors, comprising:
    a substrate, wherein the substrate is configured with a plurality of touch panels and a removing area, each of the touch panels comprises a display area, a peripheral area, a peripheral trace, a first cover layer and a touch sensing electrode, wherein a catalytic layer is formed on the peripheral area and the removing area, the peripheral trace is formed on the catalytic layer, the peripheral trace has a side wall and a top surface, the first cover layer covers the top surface of the peripheral trace, the peripheral trace and the first cover layer are formed on the peripheral area of each of the touch panels, the touch sensing electrode is formed on the display area of each of the touch panels, and the touch sensing electrode is electrically connected with the peripheral traces via the first cover layer;
    a mark formed on the catalytic layer, wherein the mark has a side wall and a top surface; and
    a second cover layer formed on the top surface of the mark, wherein the first cover layer comprises metal nanowires and the second cover layer comprises metal nanowires, wherein the touch sensing electrode, the first cover layer and the second cover layer are made of same metal nanowire layer.

13. The roll sheet of claim 12, wherein the catalytic layer is an insulation layer comprising catalytic particles.

14. The roll sheet of claim 13, wherein the catalytic particles comprise nanoparticles.

15. The roll sheet of claim 12, wherein each of the touch panels further comprises a non-conductive area located on the display area and the peripheral area.

16. The roll sheet of claim 15, wherein each of the touch panels further comprises:
    a film layer covering the touch sensing electrode, the catalytic layer, the first cover layers and the second cover layers.

17. The roll sheet of claim 12, wherein the first cover layer has a side surface, and the side surface and the side wall of the peripheral trace are a coplanar surface formed by etching.

18. The roll sheet of claim 12, wherein the second cover layer has a side surface, and the side surface and the side wall of the mark are a coplanar surface formed by etching.

19. The roll sheet of claim 12, wherein the mark comprises a bonding alignment mark disposed in the peripheral area of each of the touch panels, or the mark comprises a cutting alignment mark, an alignment mark, a direction-indication mark, a scale mark or a digital/letter mark formed on the removing area.

20. The roll sheet of claim 12, wherein a width of the peripheral trace ranges from 5 µm to 20 µm, and a distance between the peripheral trace and an adjacent peripheral trace ranges from 5 µm to 20 µm.

21. The roll sheet of claim 12, wherein the peripheral trace and the mark are made of metal material, and the touch sensing electrode at least comprises metal nanowires.

22. The roll sheet of claim 12, wherein a resistance value between the peripheral trace and an adjacent peripheral trace is greater than $1 \times 10^3$ ohm.

23. A manufacturing method of a touch panel, comprising:
    providing a substrate, wherein the substrate comprises a display area and a peripheral area;
    forming a catalytic layer on the peripheral area;
    forming a metal layer on the catalytic layer;
    forming a metal nanowire layer on the display area and the peripheral area; and
    performing a patterning step for patterning the metal layer to form a peripheral trace and a mark, wherein the peripheral trace and the mark are formed on the catalytic layer, the peripheral trace has a side wall and a top surface, and the mark has a side wall and a top surface;
    wherein the patterning step patterns the metal nanowire layer to form a touch sensing electrode within the display area, a first cover layer and a second cover layer within the peripheral area, wherein the first cover layer covers the top surface of the peripheral trace, and the second cover layer covers the top surface of the mark.

24. The manufacturing method of claim 23, wherein the patterning step further patterns the metal nanowire layer to form a touch sensing electrode, the touch sensing electrode is formed on the display area of the substrate, and the touch sensing electrode is electrically connected to the peripheral trace.

25. The manufacturing method of claim 24, wherein the catalytic layer is printed on the peripheral area.

26. The manufacturing method of claim 23, wherein the catalytic layer is formed by printing an insulation material comprising catalytic particles on the peripheral area.

27. The manufacturing method of claim 26, wherein the catalytic particles comprises nanoparticles.

28. The manufacturing method of claim 23, wherein the metal layer is formed on the catalytic layer by chemical plating.

29. The manufacturing method of claim 24, wherein the patterning step is configured to simultaneously etch the metal nanowire layer and the metal layer by an etchant.

30. The manufacturing method of claim 23, wherein the touch panel further comprises a non-conductive area formed on the display area and the peripheral area.

31. The manufacturing method of claim 30, wherein the touch panel further comprises a film layer covering the touch sensing electrode, the first cover layer, the second cover layer, and a portion of the catalytic layer in the non-conductive area on the peripheral area.

32. The manufacturing method of claim 23, wherein the first cover layer has a side surface, and the side surface and the side wall of the peripheral trace are a coplanar surface formed by etching.

33. The manufacturing method of claim 23, wherein the second cover layer has a side surface, and the side surface and the side wall of the mark are a coplanar surface formed by etching.

34. The manufacturing method of claim 23, wherein the mark comprises a bonding alignment mark.

35. The manufacturing method of claim 23, wherein a width of the peripheral traces ranges from 5 µm to 20 µm, and a distance between the peripheral trace and an adjacent peripheral trace ranges from 5 µm to 20 µm.

36. The manufacturing method of claim 23, wherein a resistance value between the peripheral trace and an adjacent peripheral trace is greater than $1\times10^3$ ohm.

* * * * *